(12) United States Patent
Kang et al.

(10) Patent No.: US 11,887,627 B2
(45) Date of Patent: Jan. 30, 2024

(54) ELECTRONIC DEVICE, METHOD, AND NON-TRANSITORY STORAGE MEDIUM FOR EDITING VIDEO

(71) Applicant: Samsung Electronics Co., Ltd., Suwon-si (KR)

(72) Inventors: Jiyoung Kang, Suwon-si (KR); Kyunghwa Seo, Suwon-si (KR); Younghak Oh, Suwon-si (KR); Won Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 17/574,096

(22) Filed: Jan. 12, 2022

(65) Prior Publication Data
US 2022/0223179 A1    Jul. 14, 2022

Related U.S. Application Data

(63) Continuation of application No. PCT/KR2022/000486, filed on Jan. 11, 2022.

(30) Foreign Application Priority Data

Jan. 12, 2021   (KR) .................. 10-2021-0004186

(51) Int. Cl.
*G11B 27/031* (2006.01)
*G06V 20/40* (2022.01)
*G11B 27/00* (2006.01)

(52) U.S. Cl.
CPC ............ *G11B 27/031* (2013.01); *G06V 20/41* (2022.01); *G11B 27/005* (2013.01)

(58) Field of Classification Search
CPC ..... G11B 27/031; G11B 27/005; G06V 20/41
See application file for complete search history.

(56) References Cited

U.S. PATENT DOCUMENTS

| 2012/0210228 A1 | 8/2012 | Wang et al. |
| 2016/0225405 A1 | 8/2016 | Matias et al. |
| (Continued) | | |

FOREIGN PATENT DOCUMENTS

| KR | 10-2011-0121830 A | 11/2011 |
| KR | 10-1265960 B1 | 5/2013 |
| (Continued) | | |

OTHER PUBLICATIONS

International Search Report and Written Opinion dated Apr. 22, 2022, issued in International Patent Application No. PCT/KR2022/000486.

*Primary Examiner* — Sunghyoun Park
(74) *Attorney, Agent, or Firm* — Jefferson IP Law, LLP

(57) ABSTRACT

An electronic device and an operation method of an electronic device for video editing are provided. The electronic device include a processor electrically connected to display circuitry, wherein the at least one processor is configured to obtain a video, classify, based on a designated condition, image frames included in the video into at least one first type interval and at least one second type interval, distinguish at least one main part, based on image frames corresponding to at least one element included in the designated condition in the at least one first type interval, set a play speed of the at least one main part to be different from a play speed of at least one different part, control the display circuitry to display an edited preview video including the at least one main part reflecting the set play speed, and store the edited preview video in the memory.

23 Claims, 12 Drawing Sheets

(56) References Cited

U.S. PATENT DOCUMENTS

| | | | |
|---|---|---|---|
| 2017/0011774 A1 | 1/2017 | Ju et al. | |
| 2018/0035075 A1* | 2/2018 | Lee | H04N 5/783 |
| 2018/0330759 A1* | 11/2018 | Funakoshi | G11B 27/005 |
| 2018/0338167 A1 | 11/2018 | Chi et al. | |
| 2019/0018641 A1* | 1/2019 | Tawada | G11B 27/10 |
| 2019/0265875 A1 | 8/2019 | Park et al. | |
| 2020/0043511 A1* | 2/2020 | Raikar | G10L 21/055 |
| 2020/0053401 A1 | 2/2020 | Obara | |
| 2021/0090611 A1* | 3/2021 | Oami | H04N 7/18 |

FOREIGN PATENT DOCUMENTS

| | | |
|---|---|---|
| KR | 10-1528312 B1 | 6/2015 |
| KR | 10-2015-0089787 A | 8/2015 |
| KR | 10-2016-0081043 A | 7/2016 |
| KR | 10-2017-0007643 A | 1/2017 |
| KR | 10-2018-0013325 A | 2/2018 |
| KR | 10-1869905 B1 | 6/2018 |
| KR | 10-2018-0126167 A | 11/2018 |
| KR | 10-2019-0065395 A | 6/2019 |
| KR | 10-2019-0101693 A | 9/2019 |

\* cited by examiner

*Very fast : x4 | Fast : x2 | Medium : x1 | Slow : x1/2 | Very slow : x1/4

| Reproduction rate | | Action (six types) | | | | | | | Gesture (three types) | | | Emotion (three types) | | | |
|---|---|---|---|---|---|---|---|---|---|---|---|---|---|---|---|
| | | Spining | Dancing | Jumping | Running | Walking | Play with pet | Eating | Hand shaking | Clapping | Wave | Happy (N sec) | Surprise (N sec) | Speaking (N sec) | Face zoom in |
| Speed | Very fast | | ○ | | ○ | | | | | | | | | | |
| | Fast | △ | ○ | | ○ | | | | | | | | | | |
| | Medium | ○ | ○ | ○ | ○ | ○ | ○ | ○ | ○ | ○ | ○ | ○ | ○ | | |
| | Slow | | | | | | | | ○ | ○ | ○ | ○ | ○ | | |
| | Very slow | | | | | | | | | | | | | ○ | ○ |
| | | Dancing/ Jumping/ Running/ Walking/ Play with pet/ Eating<br>1~3 seconds: Fast<br>3~4.5 seconds: Slow<br>4.5~7.5 seconds: Fast<br>7.5~13.5 seconds: Very Fast<br>13.5~17.5 seconds: Fast<br>17.5~19 seconds: Slow<br>19 seconds or greater: Fast | | | | | | | Same as left box | | | Happy(N sec)/ Suprise(N sec)<br>1~2 seconds: Slow<br>Interval after 2 seconds: Fast<br><br>Face<br>1~2 seconds: Slow<br>After 2 seconds: Medium | | | |

FIG.5

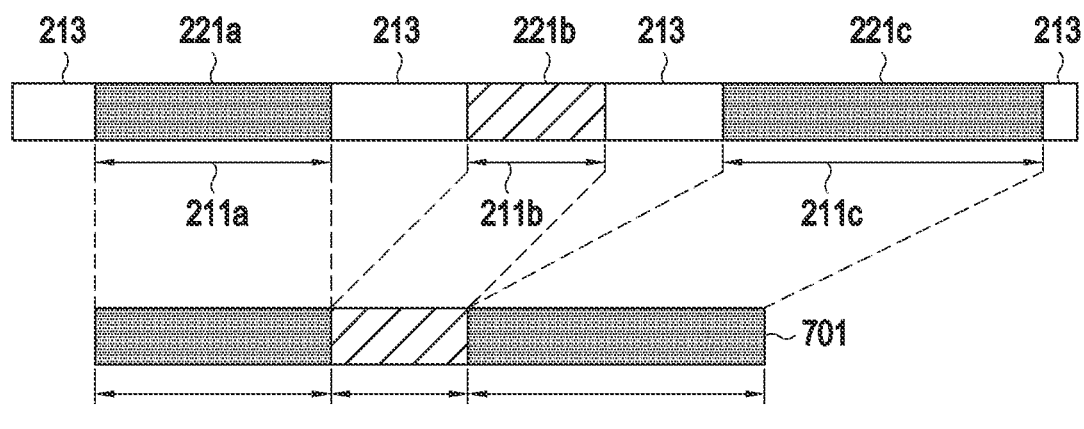
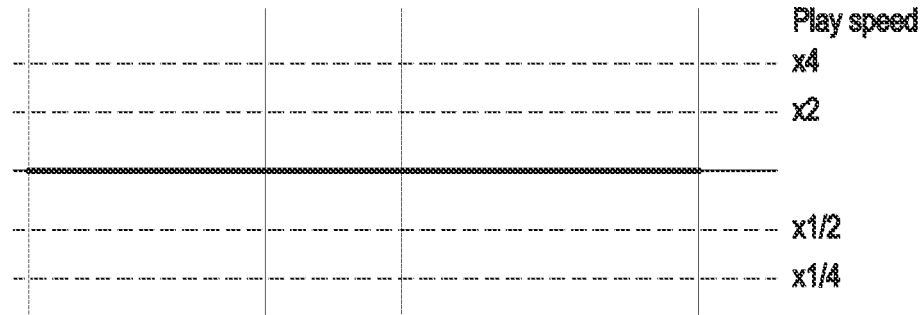
FIG.7

ELECTRONIC DEVICE, METHOD, AND NON-TRANSITORY STORAGE MEDIUM FOR EDITING VIDEO

CROSS-REFERENCE TO RELATED APPLICATION(S)

This application is a continuation application, claiming priority under § 365(c), of an International application No. PCT/KR2022/000486, filed on Jan. 11, 2022, which is based on and claims the benefit of a Korean patent application number 10-2021-0004186, filed on Jan. 12, 2021, in the Korean Intellectual Property Office, the disclosure of which is incorporated by reference herein in its entirety.

TECHNICAL FIELD

The disclosure relates to an electronic device, a method, and a non-transitory storage medium for editing a video.

BACKGROUND ART

Recently, various services and additional functions provided in electronic devices have been gradually expanded. In order to enhance the use value of these electronic devices, and satisfy various needs of users, various applications executable in electronic devices have been developed. Among these applications, some applications can provide various video-related services and functions, such as video filming, generating, and editing.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Users do not attempt to perform editing because they have trouble editing videos. These users require an application and a service which automatically generate and provide various results of video editing, and enable easy editing of generated videos.

Aspects of the disclosure are to address at least the above-mentioned problems and/or disadvantages and to provide at least the advantages described below. Accordingly, an aspect of the disclosure is to provide an electronic device, a method, and a non-transitory storage medium for video editing so as to automatically generate and provide various results of video editing, and enable easy editing of generated videos.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display module, a memory, and at least one processor electrically connected to the display module and the memory, wherein the at least one processor is configured to obtain a video, classify, based on a designated condition, image frames included in the video into at least one first type interval and at least one second type interval, distinguish at least one main part, based on image frames corresponding to at least one element included in the designated condition in the at least one first type interval, set a play speed of the at least one main part to be different from a play speed of at least one different part, control the display module to display an edited preview video including the at least one main part reflecting the set play speed, and store the edited preview video in the memory.

In accordance with another aspect of the disclosure, an operation method of an electronic device is provided. The operation method includes obtaining a video, classifying, based on a designated condition, image frames included in the video into at least one first type interval and at least one second type interval, distinguishing at least one main part, based on image frames corresponding to at least one element included in the designated condition in the at least one first type interval, setting a play speed of the at least one main part to be different from a play speed of at least one different part, displaying an edited preview video including the at least one main part reflecting the set play speed on a display module of the electronic device, and storing the edited preview video in a memory of the electronic device.

According to an embodiment, in a non-transitory storage medium storing a program, the program comprising executable instructions which, when executed by a processor of an electronic device, cause the processor to execute the operations of obtaining a video, classifying, based on a designated condition, image frames included in the video into at least one first type interval and at least one second type interval, distinguishing at least one main part, based on image frames corresponding to at least one element included in the designated condition in the at least one first type interval, setting a play speed of the at least one main part to be different from a play speed of at least one different part, displaying an edited preview video including the at least one main part reflecting the set play speed on a display module of the electronic device, and storing the edited preview video in a memory of the electronic device.

Advantageous Effects

Various embodiments disclosed herein can provide an electronic device, a method, and a non-transitory storage medium for video editing so as to enable easy editing and configuring of the play speed of a video. Accordingly, an electronic device may distinguish main parts (main scenes) included in a video, and configure different play speeds for a main part and a non-main part so as to automatically generate various results of video editing, and thus a user can enjoy provided videos without effort, or can conveniently obtain fun video results with very little effort.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 5 is a diagram illustrating an example of a designated condition in an electronic device according to an embodiment of the disclosure;

FIG. 7 is a diagram illustrating an example of editing a play speed of a video in an electronic device according to an embodiment of the disclosure;

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an electronic device according to various embodiments will be described with reference to the accompanying drawings. The term "user" used in various embodiments may indicate a person using an electronic device or a device (e.g., an artificial intelligence electronic device) using an electronic device.

Figure 1:
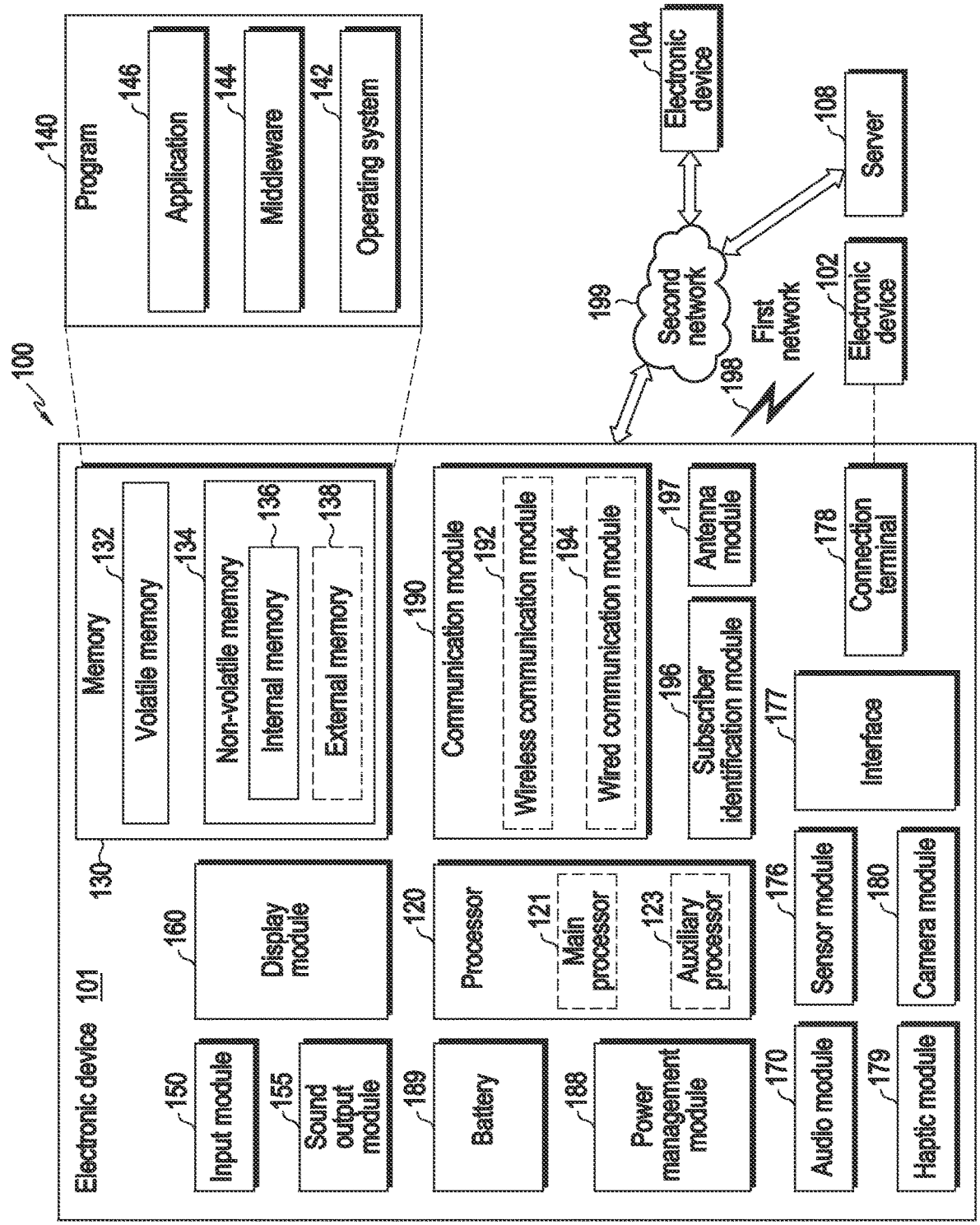
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
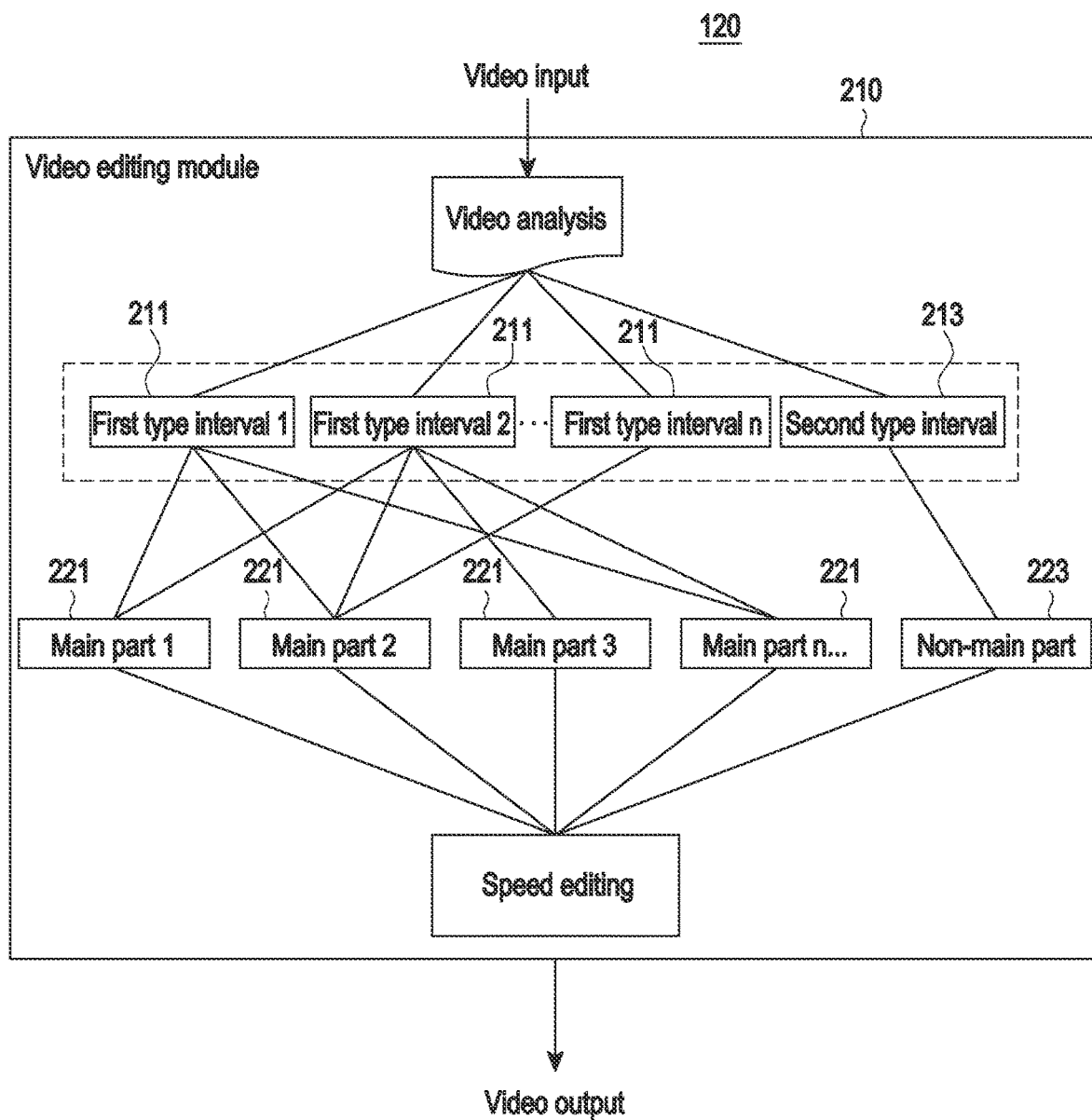
FIG. 2 is a diagram illustrating an example of a configuration of an electronic device according to an embodiment of the disclosure.

FIG. 2 is a diagram illustrating an example of a configuration of an electronic device according to an embodiment of the disclosure.

Referring to FIGS. 1 and 2, a processor 120 of an electronic device 101 according to an embodiment may be electrically connected to a memory 130 and a display module 160, and may include a video editing module 210 for editing a video (or a moving image). The video editing module 210 may be configured in a software type. The processor 120 may execute instructions stored in the memory 130 to implement the video editing module 210 illustrated in FIG. 2, and may control hardware (e.g., the display module 160, the audio module 170, or the camera module 180 in FIG. 1) associated with a function of a software module.

According to an embodiment, the processor 120 may, in response to a video editing request, obtain a video and execute a video editing application to display the obtained video in an execution screen (hereinafter, this is called a first screen) of the video editing application. The obtained video may be a video stored in the memory 130, a video received from an external device via the communication module 190, or a video filmed by the camera module 180.

According to an embodiment, the processor 120 may classify, based on a designated condition, image frames included in the video into at least one first type interval 211 (e.g., meaningful interval) and at least one second type interval 213 (e.g., meaningless interval). The first type interval 211 may include at least one image frame corresponding to the designated condition in the video. The second type interval 213 may indicate one or more image frames not corresponding to the designated condition.

According to an embodiment, the processor 120 may distinguish at least one main part (e.g., main scene) 221, based on image frames corresponding to at least one element included in the designated condition in the at least one first type interval 211. The designated condition may include at least one information among an action, a gesture, or an emotion for distinguishing the first type interval 211. The at least one information of the designated condition may include one or more different elements for extracting the at least one main part 221 (e.g., main scene) from the first type interval 211. For example, the action may include spinning, dancing, jumping, running, walking, a relaxing activity (e.g., play with pet), or eating, but is not limited thereto, and may further include various action-related elements. For example, the gesture may include hand shaking, clapping, or waving, but is not limited thereto, and may further include various gesture-related elements. For example, the emotion may include information (e.g., happy and surprise) indicating the length of the first type interval 211, information (speaking) indicating whether there is audio, and information (face zoom in) indicating person identification, and further include an element indicating a change in a scene during filming a scenery, but is not limited thereto, and may further include various emotion-related elements. For example, a play speed configured in the designated condition may be classified into 5-stage levels (e.g., very fast (4×: 1-3), fast (2×), medium (1×), slow (½×), and very slow (¼×)), but is not limited thereto, and may be classified into different levels. For example, the information (e.g., happy and surprise) indicating the length (Nsec) of the first type interval 211 in the emotion may designate slow for the interval of 1-2 seconds, and designate fast for the interval after 2 seconds. For example, the information (face zoom in) indicating person identification in the emotion may designate slow for the interval of 1-2 seconds, and designate medium for the interval after 2 seconds. For example, the processor 120 may provide various theme effects through various combination of the action, the gesture, or the emotion of the designated condition.

According to an embodiment, the processor 120 may display, on the first screen, at least one menu which can be selected for video editing. For example, the at least one menu may be a user interface which displays a preview video according to at least one editing scheme (suggested effects). As another example, the at least one menu may be a button, an object, or a graphic element which can be selected by a user for video editing. The editing scheme (suggested effects) may be at least one scheme (e.g., at least one of a first editing scheme (dynamic speed), a second editing scheme (highlights), a third editing scheme (speed ramping), a fourth editing scheme (quick summary), or a fifth editing scheme (short clip)) for providing various editing results through changing of the speed of a video. For example, the first editing scheme (dynamic speed) may provide a preview video by collecting only first type intervals 211 identified in one video and changing the speed thereof. The second editing scheme (highlights) may provide a preview video by collecting only first type intervals 211 identified in one video and unchanging the speed thereof. The third editing scheme (speed ramping) may provide a preview video by including both the first type interval 211 and the second type interval 213 identified in one video, and changing the speed of the first type interval 211. The fourth editing scheme (quick summary) may provide a preview video by including both the first type interval 211 and the second type interval 213 identified in a video, maintaining the speed of the first type interval 211 (e.g., an extraction interval) at a first speed (e.g., 1×), and adjusting the speed of the second type interval 213 (e.g., a non-extraction interval) to a second speed (e.g., 4×). The fifth editing scheme (short clip) may provide a preview video in which the speed of only one interval among the first type intervals 211 identified in a video is changed.

According to an embodiment, when the at least one menu displayed on the first screen is selected, the processor 120 may switch to a speed editing screen for editing the play speed of the video, and control the display module 160 to display a video editing screen (hereinafter, this is called a second screen). The processor 120 may control the display module 160 to display a preview video corresponding to the selected menu, and display, on the second screen, an object (edit speed) (e.g., a button, a menu, a function, or a graphic element) for editing the speed of the preview video. The second screen may include objects for storing and sharing the preview video.

According to an embodiment, the processor 120 may, in response to a speed editing request generated by selection of a menu for speed editing, displayed on the second screen, may control the display module 160 to display a speed editing screen (hereinafter, this is called a third screen) for editing the play speed of the at least one main part 221 of the first type interval 211. The processor 120 may control the display module 160 to display a first speed adjustment object (speed of highlights area) on the third screen. When an expanding object for screen expanding displayed in an area adjacent to the first speed adjustment object is selected, the processor 120 may control to expand an area in which the first speed adjustment object is displayed, and may control the display module 160 to display, in the expanded area, speed adjustment objects for speed editing for at least one element included in the designated condition. When the expanding object for screen expanding displayed in the area adjacent to the first speed adjustment object is selected one more time, the processor 120 may reduce the expanded area, and control the display module 160 to display again the first speed adjustment object in the reduced area. The processor 120 may change the play speed of the at least one main part 221 included in the preview video by using the first speed adjustment object.

According to an embodiment, in a case where the second type interval 213 is included in the preview video, the processor 120 may control the display module 160 to further display, on the third screen, a second speed adjustment object (speed of non-highlights area) for editing the play speed of the second type interval 213. The second type interval 213 is different from the at least one main part 221 of the first type interval 211, and may include a non-main part 223.

According to an embodiment, the processor 120 may configure different play speeds for the first type interval 211 and the second type interval 213 identified based on the designated condition. For example, in a case where a plurality of first type intervals 211 are identified, the processor 120 may configure different play speeds for the plurality of first type intervals 211, respectively.

According to an embodiment, the processor 120 may set the play speed of the at least one main part 221 distinguished in the first type interval 211, to be different from the play speed of the at least one different part (e.g., non-main part 223). For example, in a case where a plurality of main parts 221 are distinguished, the processor 120 may set different play speeds for the plurality of main parts 221, respectively. For example, in a case where a plurality of main parts 221 are distinguished, the processor 120 may set the same play speed for main parts distinguished by the same element included in the designated condition among the plurality of main parts 221, and set the play speed of a different main part distinguished by a different element, to be different from the play speed for the main parts distinguished by the same element. For example, when image frames corresponding to two or more elements included in the designated condition are identified from the at least one main part, the processor 120 may divide the at least one main part into sub main parts corresponding to the two or more elements, respectively, and may set different play speeds for the sub main parts.

According to an embodiment, the processor 120 may control the display module 160 to display an edited preview video including the at least one main part 221 reflecting a set play speed. The processor 120 may control the display module 160 to display the edited preview video on the second screen and/or the third screen, and when a storage object displayed on the second screen and/or the third screen is selected, may store the edited preview video in the memory 130. When the edited preview video is stored, the processor 120 may control the display module 160 to display a preview video, among the at least one preview video displayed on the first screen, corresponding to the edited preview video such that the preview video reflects the edited preview video.

According to an embodiment, when image frames corresponding to two or more elements (e.g., walking of the action, and handshaking of the gesture) included in the designated condition are identified from a particular main part among the at least one main part 221, the processor 120 may divide the particular main part into sub main parts corresponding to the two or more elements, respectively. The processor 120 may set different play speeds for the sub main parts, and generate an edited preview video including the sub main parts reflecting the set different play speeds. For example, the processor 120 may control the display module 160 to display, on a screen obtained by expanding a fourth screen, an individual speed adjustment object for adjusting the play speed of a first sub main part corresponding to an element (e.g., hand shaking of the gesture). For example, the processor 120 may adjust the play speed (e.g., 3×) of the first sub main part included in the particular main part by using an individual speed adjustment object 451, and may maintain the play speed of a second sub main part at a play speed set for the particular main part.

As described above, in an embodiment, main elements of the electronic device have been described with reference to the electronic device 101 illustrated in FIGS. 1 and 2. However, in various embodiments, not all the elements illustrated in FIGS. 1 and 2 are essential elements, the electronic device 101 may be implemented by more elements than the illustrated elements, or the electronic device 101 may be implemented by fewer elements than the illustrated elements. In addition, the positions of main elements of the electronic device 101 described with reference to FIGS. 1 and 2 can be changed according to various embodiments.

According to an embodiment, the electronic device 101 (e.g., the electronic device 101 in FIGS. 1 and 2) may include a display module (e.g., the display module 160 in FIG. 1), a memory (e.g., the memory 130 in FIG. 1), and at least one processor (e.g., the processor 120 in FIG. 1) electrically connected to the display module and the memory, wherein the at least one processor is configured to obtain a video, classify, based on a designated condition, image frames included in the video into at least one first type interval and at least one second type interval, distinguish at least one main part, based on image frames corresponding to at least one element included in the designated condition in the at least one first type interval, set a play speed of the at least one main part to be different from a play speed of at least one different part, control the display module to display an edited preview video including the at least one main part reflecting the set play speed, and store the edited preview video in the memory.

According to an embodiment, the at least one processor may be configured to display the video on a first screen, control the display module to display at least one preview video according to at least one editing scheme for video editing in an area adjacent to the first screen on which the video is displayed, in response to the at least one preview video being selected, control the display module to display a second screen for editing the selected preview video, control, in response to a speed editing request, the display module to display a third screen for editing a play speed of the video, and control the display module to display, on the third screen, a first speed adjustment object for editing the play speed of the at least one main part.

According to an embodiment, the at least one processor may be configured to display a second speed adjustment object for editing the play speed of the different part on the third screen, the different part being a non-main part included in the second type interval, and control the display module to display, on an expansion area of the speed editing screen, individual speed adjustment objects for adjusting play speeds of a plurality of main parts.

According to an embodiment, the at least one processor may be configured to, when there are a plurality of first type intervals, collect the plurality of first type intervals except the second type interval to generate the edited preview video.

According to an embodiment, the at least one processor may be configured to, in response to there being a plurality of main parts, set different play speeds for the multiple main parts, respectively, and generate the edited preview video including the plurality of main parts reflecting the set different play speeds.

According to an embodiment, the at least one processor may be configured to generate the edited preview video including the at least one main part reflecting the set play speed and the different part included in the second type interval.

According to an embodiment, the at least one processor may be configured to, in response to there being a plurality of main parts, set a first play speed for main parts corresponding to a first element included in the designated condition among the plurality of main parts, set a second play speed for at least one different main part corresponding to a second element included in the designated condition, and set a third play speed for the different part included in the second type interval.

According to an embodiment, the at least one processor may be configured to, in response to there being a plurality of main parts, adjust a play speed of one of the plurality of main parts.

According to an embodiment, the electronic device may be configured to, in response to image frames corresponding to two or more elements included in the designated condition being identified in the at least one main part, divide the at least one main part into sub main parts corresponding to the two or more elements, respectively, set different play speeds for the sub main parts, and generate the edited preview video including the sub main parts reflecting the set different play speeds.

According to an embodiment, the designated condition may include information on at least one among an action, a gesture, or an emotion for distinguishing the first type interval, and the first type interval may include at least one image frame corresponding to the designated condition.

Figure 3:
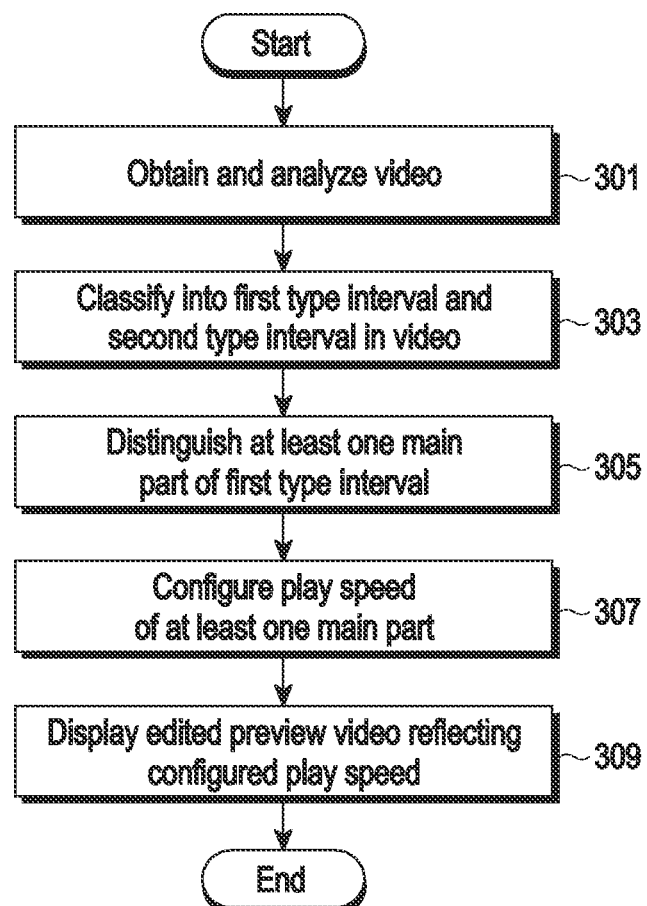
FIG. 3 is a diagram illustrating an example of an operation method of an electronic device according to an embodiment of the disclosure.
Figure 4:
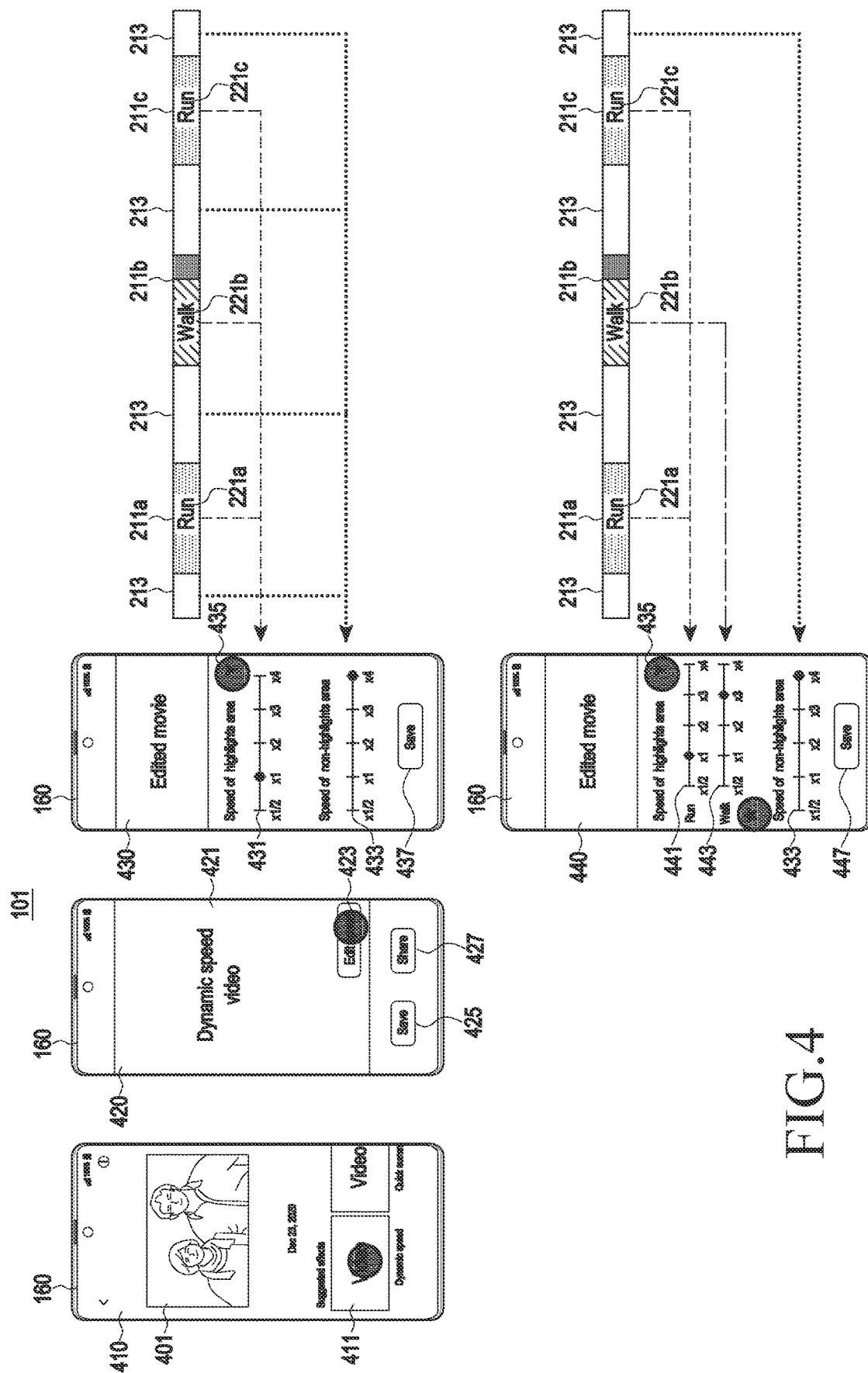
FIG. 4 is a diagram illustrating an example of an operation method of an electronic device according to an embodiment of the disclosure.

FIG. 3 is a diagram illustrating an example of an operation method of an electronic device according to an embodiment of the disclosure. FIG. 4 is a diagram illustrating an example of an operation method of an electronic device according to an embodiment of the disclosure.

Referring to FIGS. 3 and 4, according to an embodiment, an electronic device 101 (e.g., an electronic device 101 in FIGS. 1 and 2) may, in operation 301, in response to a video editing request, execute a video editing application, obtain a video 401, and analyze the obtained video 401. The electronic device 101 may display the obtained video 401 on an execution screen (e.g., first screen 410) of the video editing application by the display module 160 (e.g., the display module 160 in FIG. 1). The obtained video may be a video stored in a memory (e.g., the memory 130 in FIG. 1), a video received from an external device via a communication module (e.g., the communication module 190 in FIG. 1), or a video filmed by a camera module (e.g., the camera module 180 in FIG. 1). The electronic device 101 may display, on the first screen 410, at least one menu 411 which can be selected for video editing. For example, the at least one menu 411 may be a user interface which displays a preview video according to at least one editing scheme (suggested effects). As another example, the at least one menu may be a button, an object, or a graphic element which can be selected by a user for video editing.

In operation 303, the electronic device 101 may classify image frames included in the video 401 into at least one first type interval 211a, 211b, and 211c (e.g., the first type interval 211 in FIG. 2) and at least one second type interval 213 (e.g., the second type interval 213 in FIG. 2), based on a designated condition in the analyzed video. The first type interval 211a, 211b, and 211c may include at least one image frame corresponding to the designated condition in the video. The second type interval 213 may indicate one or more image frames not corresponding to the designated condition.

In operation 305, the electronic device 101 may distinguish at least one main part 221a, 221b, and 221c (e.g., the at least one main part 221 in FIG. 2), based on image frames corresponding to at least one element included in the designated condition in the at least one first type interval 211a, 211b, and 211c.

In operation 307, the electronic device 101 may perform an operation for editing the play speed of the at least one main part 221a, 221b, and 221c. The electronic device 101 may set the play speed of the main parts 221a, 221b, and 221c to be different from that of at least one different part. The different part may be a non-main part (e.g., the non-main part 223 in FIG. 2) as a part which is included in the second type interval 213, and is different from the main parts 221a, 221b, and 221c of the first type intervals 211a, 211b, and 211c.

In operation 309, the electronic device 101 may display an edited preview video including the at least one main part 221a, 221b, and 221c reflecting the set play speed according to storage of a result of the edit according to the set play speed.

Referring to FIGS. 3 and 4 again, when operation 305 in FIG. 3 is performed, the electronic device 101 (e.g., the electronic device 101 in FIGS. 1 and 2) according to an embodiment may distinguish main parts 221a, 221b, and 221c in the one video 401, as illustrated in FIG. 4, based on image frames corresponding to at least one element included in the designated condition in the at least one first type interval 211a, 211b, and 211c. For example, when the designated condition is identified as, for example, an action through analysis of the video, the electronic device 101 may identify the first and third main parts 221a and 221c among the main parts 221a, 221b, and 221c as main parts corresponding to a first element (e.g., run), and identify the remaining second main part 221b as a main part corresponding to a second element (e.g., walk). The electronic device 101 may identify an editing scheme indicated by the selected menu 411 in the first screen 410. For example, when the selected menu 411 indicates a second editing scheme (dynamic speed), the plurality of second type intervals 213 may be excluded, only the plurality of first type intervals 211a, 211b, and 211c may be collected to generate a preview video 421 for editing, and the generated preview video 421 may be displayed on a video editing screen (e.g., second screen 420). The preview video 421 displayed on the second screen 420 may be output at the same speed as before the play speed is edited. As another example, when the selected menu 411 is at least one of a third editing scheme (speed ramping), a fourth editing scheme (quick summary), or a fifth editing scheme (short clip), only the plurality of first type intervals 211a, 211b, and 211c may be displayed without being collected, as the preview video 421 for editing. When editing of the play speed is completed, the preview video 421 may be displayed by being replaced with an edited preview video reflecting a result of the edit according to a set play speed.

Referring to FIGS. 3 and 4 again, when operation 307 in FIG. 3 is performed, the electronic device 101 (e.g., the electronic device 101 in FIGS. 1 and 2) according to an embodiment may, for example, when the at least one menu 411 displayed on the first screen 410 is selected, switch to the second screen 420 for editing the video 401, and display the second screen 420 on the display module 160. The electronic device 101 may display the preview video 421 (a dynamic speed video) corresponding to the selected menu 411, and display, on the second screen 420, an object (edit speed) 423 (e.g., a button, a menu, a function, or a graphic element) for editing the speed of the preview video 421. The electronic device 101 may display, on the second screen 420, a storage object (save) 425 for storing the preview video 421 and an object (share) 427 for sharing same. The preview video 421 (a dynamic speed video) may be a preview video before speed editing.

According to an embodiment, as illustrated in FIG. 4, in response to a speed editing request generated by selection of the object 423 for speed editing, displayed on the second screen 420, the electronic device 101 may display a speed editing screen (e.g., third screen 430) for editing the play speed of the at least one main part 221a, 221b, and 221c of the identified first type intervals 211a, 211b, and 211c. The electronic device 101 may display, on the third screen 430, a first speed adjustment object 431 (speed of highlights area) for editing the play speed of the at least one main part 221a, 221b, and 221c of the first type intervals 211a, 211b, and 211c included in the preview video 421. For example, the electronic device 101 may set the play speeds of the plurality of main part 221a, 221b, and 221c included in the preview video 421 by using the first speed adjustment object 431. For example, the electronic device 101 may set different play speeds for the first type intervals 211a, 211b, and 211c and the second type interval 213. For example, the electronic device 101 may collectively adjust the play speed of the first type intervals 211a, 211b, and 211c by 1× by using the first speed adjustment object 431.

According to an embodiment, in a case where the second type interval 213 is included in the preview video 421 as illustrated in FIG. 4, the electronic device 101 may display, on the third screen 430, a second speed adjustment object 433 (speed of non-highlights area) for editing the play speed of the second type interval. The electronic device 101 may adjust the play speed of the second type interval 213 by 4× by using the second speed adjustment object 433. As another example, if the preview video 421 is generated by collecting the first type intervals 211a, 211b, and 211c, and does not include the second type interval 213, the electronic device 101 may not display the second speed adjustment object 433 on the third screen 430.

According to an embodiment, the electronic device 101 may, as illustrated in FIG. 4, display, on the third screen 430, a storage object (save) 437 for storing a speed editing result. When the storage object 437 displayed on the third screen 430 is selected, the electronic device 101 may store a result of the edit according to the configuration play speed. The electronic device 101 may replace the preview video 421 displayed on the second screen 420 with an edited preview video (edited movie), and display the edited preview video. When the storage object 425 displayed on the second screen 420 is selected, the edited preview video may be stored in the memory 130. For example, when the edited preview video is stored, the electronic device 101 may control the display module 160 to display the edited preview video instead of a preview video, among the at least one preview video displayed on the first screen, corresponding to the edited preview video. As another example, the electronic device 101 may display a preview video displayed on the first screen 410 in a thumbnail image type, and when a thumbnail image is selected, an edited preview video may be displayed (or reproduced) on the second screen 420 according to a set play speed.

According to an embodiment, the electronic device 101 may, as illustrated in FIG. 4, display, on the third screen 430, an expanding object 435 for screen expanding, displayed in an area adjacent to the first speed adjustment object 431. When the expanding object 435 is selected, the electronic device 101 may expand an area in which the first speed adjustment object 431 is displayed, and may display, on an expanded speed editing screen (e.g., fourth screen 440), speed adjustment objects for speed editing for at least one element included in the designated condition in the expanded area. When the expanding object 435 is selected one more time, the electronic device 101 may reduce the area expanded on the fourth screen 440, and display the third screen 430 displaying again the first speed adjustment object 431 in the reduced area. For example, the electronic device 101 may display, on the fourth screen 440, individual speed adjustment objects 441 and 443 for individually configuring the play speeds of the plurality of main parts 221a, 221b, and 221c for each of the elements (e.g., run and walk) included in the designated condition. For example, the electronic device 101 may collectively adjust the speed of the first main part 221a and the third main part 221c corresponding to the first element (e.g., run) by 1× by using the individual speed adjustment object 441. The electronic device 101 may adjust the speed of the second main part 221b corresponding to the second element (e.g., walk) by 3× by using the individual speed adjustment object 443. As another example, the electronic device 101 may set different play speeds for the plurality of main parts 221a, 221b, and 221c.

FIG. 5 is a diagram illustrating an example of a designated condition in an electronic device according to an embodiment of the disclosure.

Referring to FIG. 5, a designated condition may include at least one information among an action, a gesture, or an emotion for distinguishing the first type interval. The at least one information of the designated condition may include one or more different elements for extracting the at least one main part (e.g., main scene) from the first type interval. For example, the action may include spinning, dancing, jumping, running, walking, a relaxing activity (play with pet), or eating, but is not limited thereto, and may further include various action-related elements. For example, the gesture may include hand shaking, clapping, or waving, but is not limited thereto, and may further include various gesture-related elements. For example, the emotion may include information (e.g., happy and surprise) indicating the length of the first type interval, information (speaking) indicating whether there is audio, and information (face zoom in) indicating person identification, and further include an element indicating a change in a scene during filming a scenery, but is not limited thereto, and may further include various emotion-related element. For example, as illustrated in FIG. 5, a play speed set in the designated condition may be classified into 5-stage levels (e.g., very fast (4×: 1-3), fast (2×), medium (1×), slow (½×), and very slow (¼×)), but is not limited thereto, and may be classified into different levels. For example, the information (e.g., happy and surprise) indicating the length (Nsec) of the first type interval in the emotion may designate slow for the interval of 1-2 seconds, and designate fast for the interval after 2 seconds. For example, the information (face zoom in) indicating person identification in the emotion may designate slow for the interval of 1-2 seconds, and designate medium for the interval after 2 seconds.

Figure 6A:
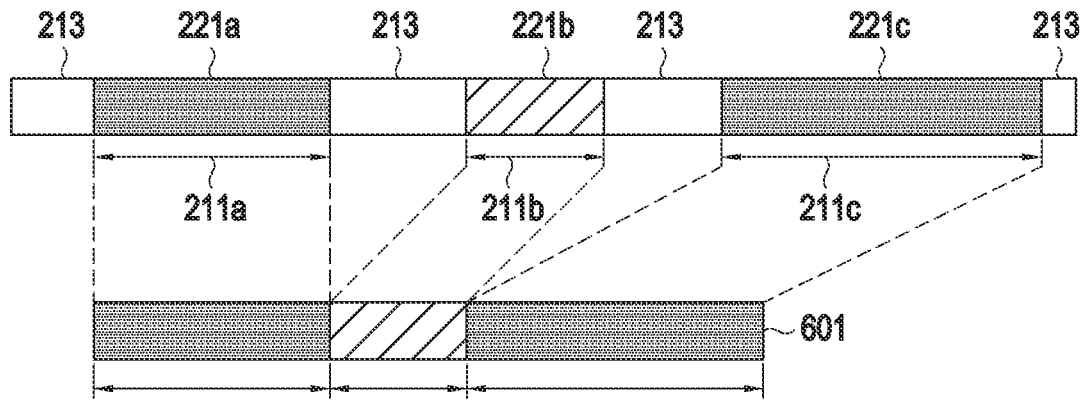
FIGS. 6A, 6B, and 6C are diagrams illustrating an example of editing a play speed of a video in an electronic device according to an embodiment of the disclosure.
Figure 6B:
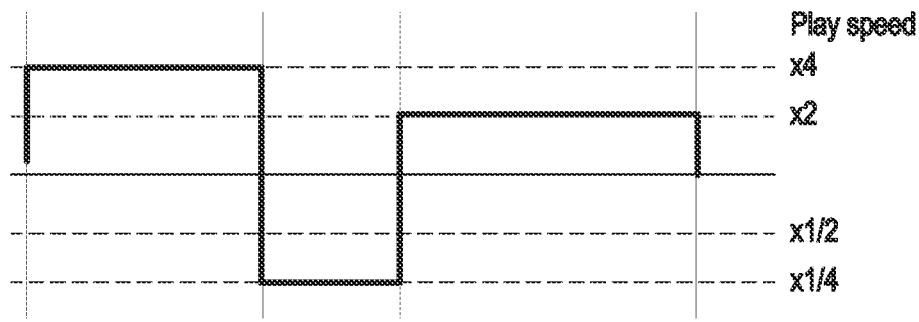
Figure 6C:
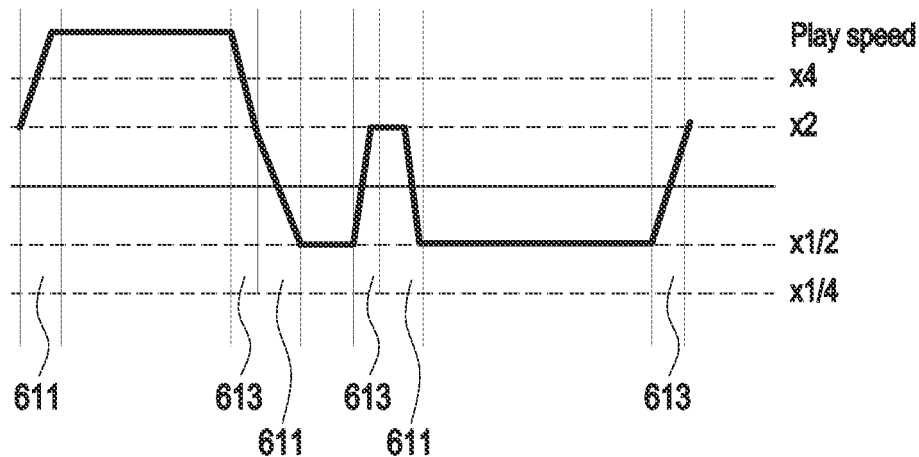

FIGS. 6A, 6B, and 6C are diagrams illustrating an example of editing a play speed of a video in an electronic device according to an embodiment of the disclosure.

Referring to FIGS. 3, 4, 6A, 6B, and 6C, according to an embodiment, when operations 303 and 305 in FIG. 3 are performed, the electronic device 101 (e.g., the electronic device 101 in FIGS. 1 and 2) may divide the video 401 into a plurality of first type intervals 211a, 211b, and 211c, and a plurality of second type intervals 213, as illustrated in FIG. 6A, and identify the main parts 221a, 221b, and 221c in the plurality of first type intervals 211a, 211b, and 211c. The electronic device 101 may identify that the menu 411 selected on the first screen 410 is a first editing scheme (dynamic speed), and may generate a preview video 601 to be edited (e.g., the preview video 421 in FIG. 4) by excluding the second type intervals 213 and collecting only the plurality of first type intervals 211a, 211b, and 211c according to the first editing scheme (dynamic speed).

According to an embodiment, when operation 307 in FIG. 3 is performed, the electronic device 101 may set the main parts 221a, 221b, and 221c to have different play speeds, respectively, as illustrated in FIG. 6B. For example, the electronic device 101 may adjust the play speed of the first main part 221a, among the main parts 221a, 221b, and 221c, to a speed (e.g., very fast (4×) for running in FIG. 5) designated for a first element (e.g., running), adjust the play speed of the second main part 221b to a speed (e.g., slow (½×) for walking in FIG. 5) designated for a second element (e.g., walking), and adjust the play speed of the third main part 221c to a speed (e.g., fast (2×) for running in FIG. 5) designated for the first element (e.g., running) As illustrated in FIG. 6C, when each of a pre-start interval 611 and a post-end interval 613 is longer than a designated time (e.g., 1 s), the electronic device 101 may use the pre-start interval 611 and the post-end interval 613 as intervals in which the speed changes to allow a user to feel ramping. The pre-start interval 611 may be used in a case where there is a preparation motion before the main part is started, and the post-end interval 613 may be used in a case where there is an ending motion after the main part is ended. For example, the electronic device 101 may apply BGM in the first editing scheme (dynamic speed). For example, in a case where audio information is applied to the edited preview video, the electronic device 101 may configure a sound fade out state for a slow interval, and may configure a sound fade in state after the slow interval is ended.

FIG. 7 is a diagram illustrating an example of editing a play speed of a video in an electronic device according to an embodiment of the disclosure.

Referring to FIGS. 3, 4, and 7, according to an embodiment, when operations 303 and 305 in FIG. 3 are performed, the electronic device 101 (e.g., the electronic device 101 in FIGS. 1 and 2) may divide the obtained video 401 into a plurality of first type intervals 211a, 211b, and 211c, and a plurality of second type intervals 213, and identify the main parts 221a, 221b, and 221c in the plurality of first type intervals 211a, 211b, and 211c. The electronic device 101 may identify that the menu 411 selected on the first screen 410 is a second editing scheme (highlights), and may generate a preview video 701 (e.g., the preview video 421 in FIG. 4) by including all the plurality of first type intervals 211a, 211b, and 211c and second type intervals 213 according to the second editing scheme (highlights). The electronic device 101 may configure the plurality of first type intervals 211a, 211b, and 211c and second type intervals 213 to be all output at the same 1× speed, without editing the play speed according to the second editing scheme (highlights). The second editing scheme (highlights) may provide a preview video by collecting only the first type intervals identified in one video and unchanging the speed thereof.

Figure 8:
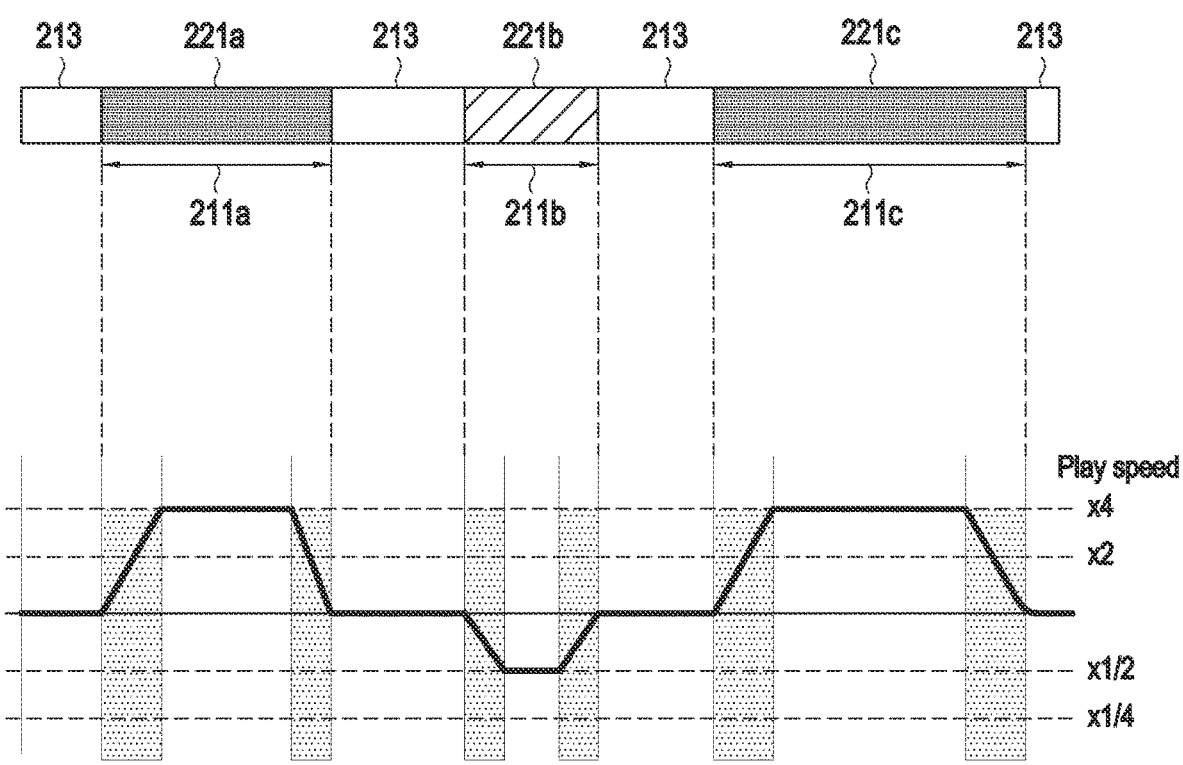
FIG. 8 is a diagram illustrating an example of editing a play speed of a video in an electronic device according to an embodiment of the disclosure.

FIG. 8 is a diagram illustrating an example of editing a play speed of a video in an electronic device according to an embodiment of the disclosure.

Referring to FIGS. 3, 4, and 8, according to an embodiment, when operations 303 and 305 in FIG. 3 are performed, the electronic device 101 (e.g., the electronic device 101 in FIGS. 1 and 2) may divide the obtained video 401 into a plurality of first type intervals 211a, 211b, and 211c, and a plurality of second type intervals 213, and identify the main parts 221a, 221b, and 221c in the plurality of first type intervals 211a, 211b, and 211c. The electronic device 101 may identify that the menu 411 selected on the first screen 410 is a third editing scheme (speed ramping), and may generate a preview video (e.g., the preview video 421 in FIG. 4), which includes all the plurality of first type intervals 211a, 211b, and 211c and second type intervals 213, and has undergone play speed editing, according to the third editing scheme (speed ramping). The third editing scheme (speed ramping) may provide a preview video by including both the first type interval and the second type interval identified in one video, and changing the speed of the first type interval.

According to an embodiment, when operation 307 in FIG. 3 is performed, the electronic device 101 may collectively adjust the play speed of the first main part 221a and the third main part 221c among the main parts 221a, 221b, and 221c to a speed (e.g., very fast (4×) for running in FIG. 5) designated for a first element (e.g., running) because the same main parts both correspond to the first element (e.g., running), and adjust the play speed of the second main part 221b to a speed (e.g., slow (½×) for walking in FIG. 5) designated for a second element (e.g., walking). The play speed of the second type interval 213 may be configured to be maintained at 1×.

Figure 9:
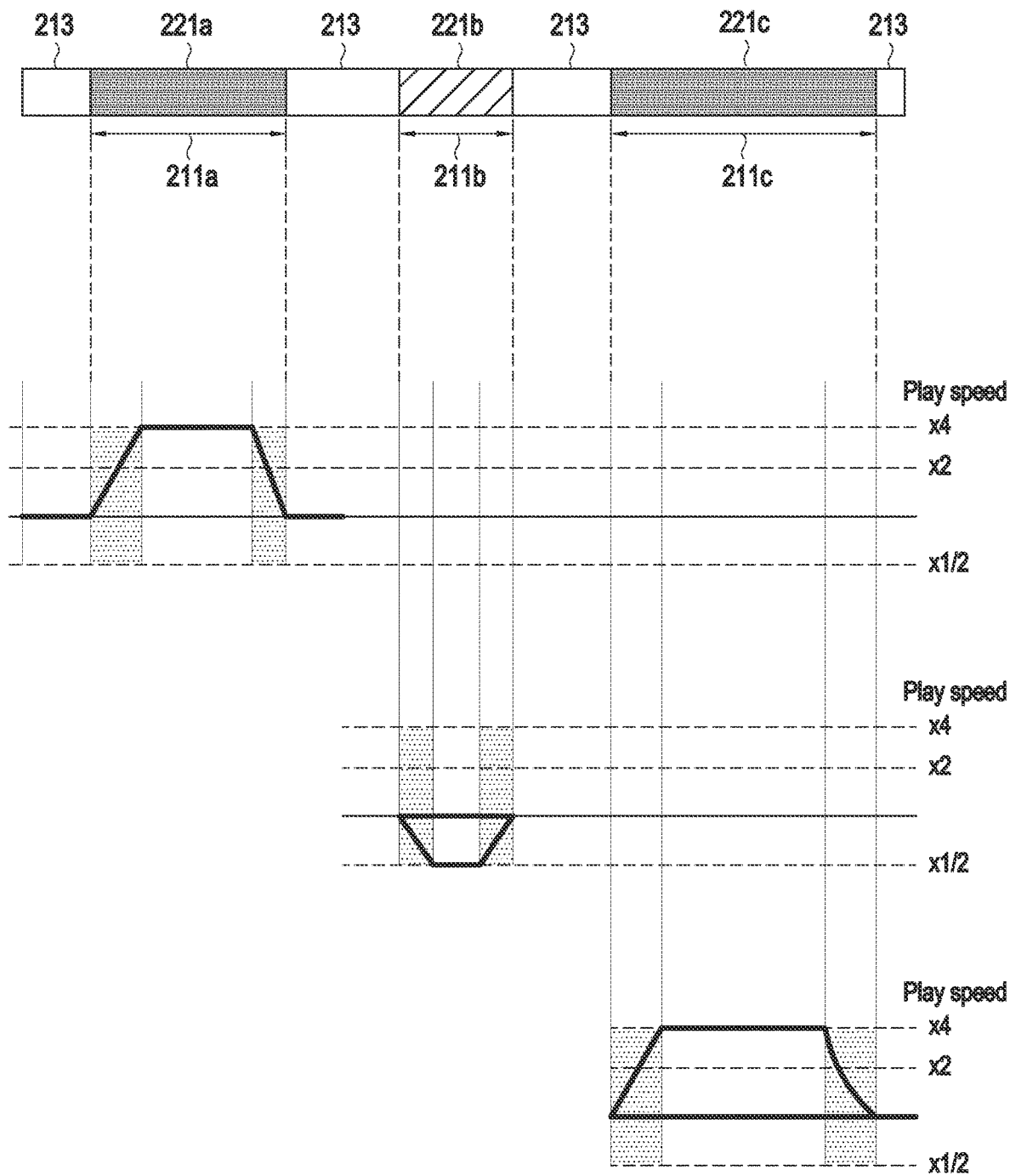
FIG. 9 is a diagram illustrating an example of editing a play speed of a video in an electronic device according to an embodiment of the disclosure.

FIG. 9 is a diagram illustrating an example of editing a play speed of a video in an electronic device according to an embodiment of the disclosure.

Referring to FIGS. 3, 4, and 9, according to an embodiment, when operations 303 and 305 in FIG. 3 are performed, the electronic device 101 (e.g., the electronic device 101 in FIGS. 1 and 2) may divide the obtained video 401 into a plurality of first type intervals 211a, 211b, and 211c, and a plurality of second type intervals 213, and identify the main parts 221a, 221b, and 221c in the plurality of first type intervals 211a, 211b, and 211c. The electronic device 101 may identify that the menu 411 selected on the first screen 410 is a fourth editing scheme (quick summary), and may generate a preview video (e.g., the preview video 421 in FIG. 4), which includes all the plurality of first type intervals 211a, 211b, and 211c and second type intervals 213, and has undergone editing of a play speed, according to the fourth editing scheme (quick summary). The fourth editing scheme (quick summary) may provide a preview video by including both the first type interval and the second type interval identified in a video, maintaining the speed of the first type interval (e.g., an extraction interval) at 1×, and adjusting the speed of the second type interval (e.g., a non-extraction interval) by 4×. For example, the electronic device 101 may apply BGM in the fourth editing scheme (quick summary).

Figure 10:
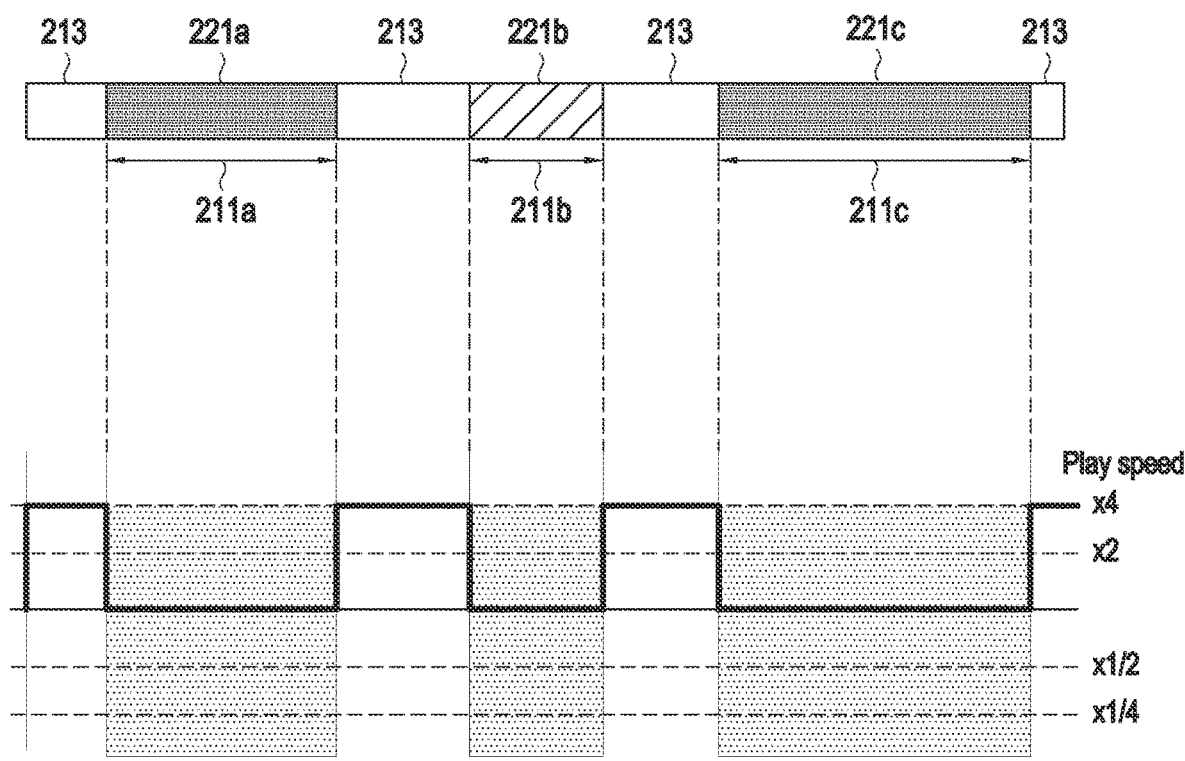
FIG. 10 is a diagram illustrating an example of editing a play speed of a video in an electronic device according to an embodiment of the disclosure.

FIG. 10 is a diagram illustrating an example of editing a play speed of a video in an electronic device according to an embodiment of the disclosure.

Referring to FIGS. 3, 4, and 10, according to an embodiment, when operations 303 and 305 in FIG. 3 are performed, the electronic device 101 (e.g., the electronic device 101 in FIGS. 1 and 2) may divide the obtained video 401 into a plurality of first type intervals 211a, 211b, and 211c, and a plurality of second type intervals 213, and identify the main parts 221a, 221b, and 221c in the plurality of first type intervals 211a, 211b, and 211c. The electronic device 101 may identify that the menu 411 selected on the first screen 410 is a fifth editing scheme (short clip), and may generate a preview video (e.g., the preview video 421 in FIG. 4), which includes all the plurality of first type intervals 211a, 211b, and 211c and second type intervals 213, and has undergone playediting of a play speed, according to the fifth editing scheme (short clip). The fifth editing scheme (short clip) may provide a preview video in which the speed of only one interval among the first type intervals identified in a video is changed.

According to an embodiment, when operation 307 in FIG. 3 is performed, the electronic device 101 may adjust only one main part of the main parts 221a, 221b, and 221c to a designated speed. For example, the electronic device 101 may adjust the play speed of the first main part 221a to a speed (e.g., very fast (4×) for running in FIG. 5) designated for the first element (e.g., running) As another example, the electronic device 101 may adjust the speed of the second main part 221b to a speed (e.g., slow (½×) for walking in FIG. 5) designated for the second element (e.g., walking). As yet another example, the electronic device 101 may adjust the play speed of the third main part 221c to a speed (e.g., very fast (4×) for running in FIG. 5) designated for the first element (e.g., running) For example, information of a designated condition for an interval provided as a clip may be an action and an emotion, the electronic device 101 may configure, according to the length of a clip, slow for a clip with 1-2 seconds, fast for a clip with 2.1-8 seconds, and very fast for a clip with 8.1 seconds or longer. When a video editing operation is performed, in a case where the first editing scheme (dynamic speed) and the fifth editing scheme (short clip) are the same, the electronic device 101 may not provide the fifth editing scheme (short clip). For example, the electronic device 101 may not apply background music (BGM) in the fifth editing scheme (short clip).

Figure 11:
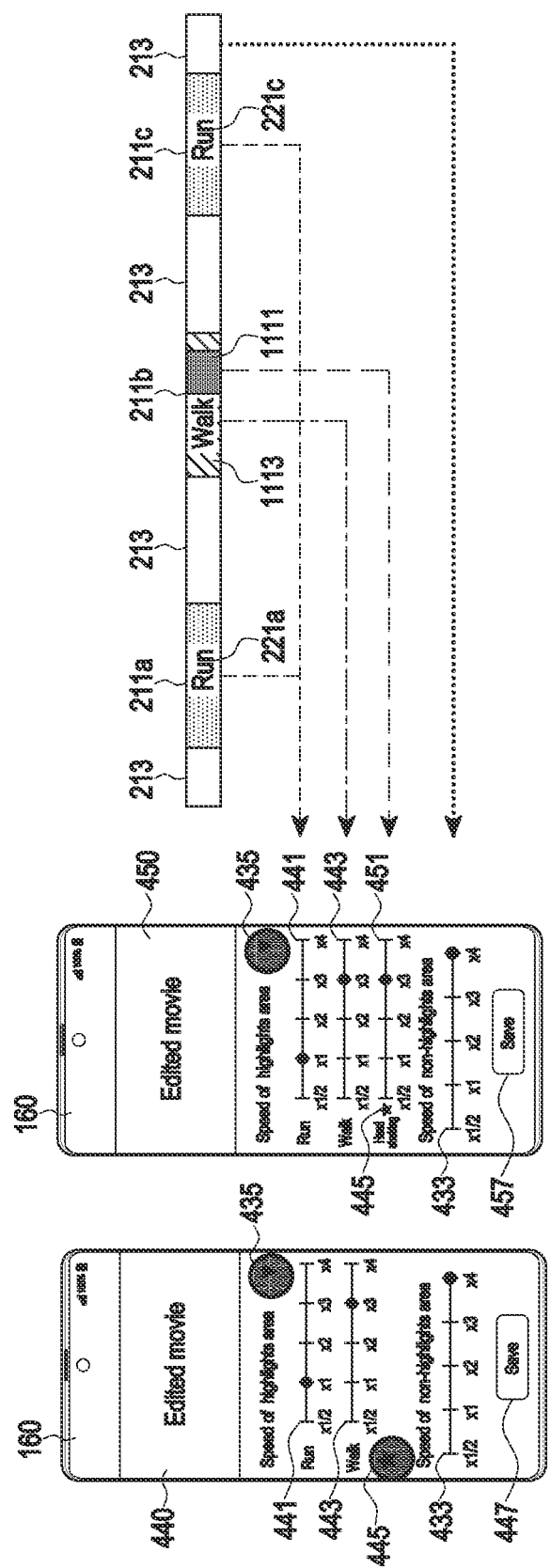
FIG. 11 is a diagram illustrating an operation method for video editing in an electronic device according to an embodiment of the disclosure.
Figure 12:
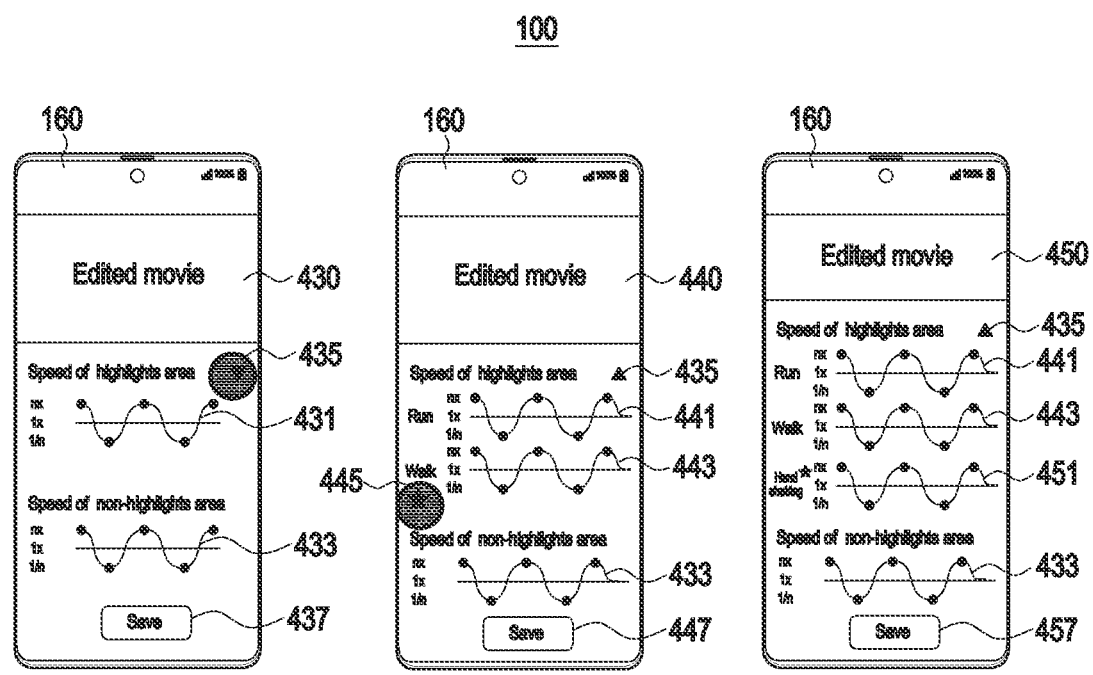
FIG. 12 is a diagram illustrating an operation method for video editing in an electronic device according to an embodiment of the disclosure.

FIG. 11 is a diagram illustrating an operation method for video editing in an electronic device according to an embodiment of the disclosure. FIG. 12 is a diagram illustrating an operation method for video editing in an electronic device according to an embodiment of the disclosure.

Referring to FIGS. 3 and 11, according to an embodiment, when operations 303 and 305 in FIG. 3 are performed, the electronic device 101 (e.g., the electronic device 101 in FIGS. 1 and 2) may divide the obtained video 401 into a plurality of first type intervals 211a, 211b, and 211c, and a plurality of second type intervals 213, and identify the main parts 221a, 221b, and 221c in the plurality of first type intervals 211a, 211b, and 211c. The electronic device 101 may identify that some of the main parts 221a, 221b, and 221c include image frames corresponding to different elements. For example, the electronic device 101 may identify that the main parts 221a and 221c both correspond to the first element (e.g., running of the action), or correspond to different elements (e.g., running and jumping of the action), respectively. For example, the electronic device 101 may identify that there are image frames corresponding to a third element (e.g., hand shaking of the gesture) in the second main part 221b. The electronic device 101 may classify, into sub main parts 1111, the image frames corresponding to the third element, which are identified in the second part 221b. The electronic device 101 may further identify sub main parts in identified main parts according to a reference condition as illustrated in FIG. 5 so as to provide 2-step video speed changes.

Referring to FIGS. 3, 4, 11, and 12, according to an embodiment, the electronic device 101 may, in response to a speed editing request generated by selection of the object 423 displayed on the second screen 420, may display, on the third screen 430, the first speed adjustment object 431 (speed of highlights area) for editing the play speed of at least one main part of the first type intervals 211a, 211b, and 211c included in the preview video 421. For example, the electronic device 101 may set the play speeds of the plurality of main part 221a, 221b, and 221c included in the preview video 1101 by using the first speed adjustment object 431. For example, the electronic device 101 may set different play speeds for the first type intervals 211a, 211b, and 211c and the second type interval 213. For example, the electronic device 101 may collectively adjust the play speed of the first type intervals 211a, 211b, and 211c by 1× by using the first speed adjustment object 431. In a case where the second type interval 213 is included in the preview video 421, the electronic device 101 may display, on the third screen 430, the second speed adjustment object 433 (speed of non-highlights area) for editing the play speed of the second type interval. The electronic device 101 may adjust the play speed of the second type interval 213 by 4× by using the second speed adjustment object 433. As another example, if the preview video 421 is generated by collecting the first type intervals 211a, 211b, and 211c, and does not include the second type interval, the electronic device 101 may not display the second speed adjustment object 433 on the third screen 430. The electronic device 101 may display, on the third screen 430, the storage object 437 for storing a speed editing result. When the storage object 437 displayed on the third screen 430 is selected, the electronic device 101 may store a result of the edit according to a configuration play speed. The electronic device 101 may replace the preview video 421 displayed on the second screen 420 with an edited preview video, and display the edited preview video. When the storage object 425 displayed on the second screen is selected, the edited preview video may be stored in a memory (e.g., the memory 130 in FIG. 1). For example, when the edited preview video is stored, the electronic device 101 may display, on the display module 160, the edited preview video instead of a preview video, among the at least one preview video displayed on the first screen, corresponding to the edited preview video. As another example, the electronic device 101 may display a preview video displayed on the first screen 410 in a thumbnail image type, and when a thumbnail image is selected, an edited preview video may be displayed (or reproduced) on the second screen 420 according to a set play speed.

According to an embodiment, the electronic device 101 may display, on the third screen 430, the expanding object 435 for screen expanding, displayed in an area adjacent to the first speed adjustment object 431. When the expanding object 435 is selected, the electronic device 101 may expand an area in which the first speed adjustment object 431 is displayed, and may control the display module 160 to display, on the expanded speed editing screen (e.g., fourth screen 440), speed adjustment objects for speed editing for at least one element included in the designated condition in the expanded area. When the expanding object 435 is selected one more time, the electronic device 101 may reduce the area expanded on the fourth screen 440, and display the third screen 430 displaying again the first speed adjustment object 431 in the reduced area. For example, the electronic device 101 may display, on the fourth screen 440, individual speed adjustment objects 441 and 443 for individually configuring the play speeds of the plurality of main parts 221a, 221b, and 221c for each of the elements (e.g., run and walk) included in the designated condition. For example, the electronic device 101 may collectively adjust the speed of the first main part 221a and the third main part 221c corresponding to the first element (e.g., run) by 1× by using the individual speed adjustment object 441. The electronic device 101 may adjust the speed of the second main part 221b corresponding to the second element (e.g., walk) by 3× by using the individual speed adjustment object 443. As another example, the electronic device 101 may set different output speeds for the plurality of main parts 221a, 221b, and 221c.

According to an embodiment, the electronic device 101 may display, on the fourth screen 440, a storage object (save) 447 for storing the edited preview video. When the storage object 447 is selected, the electronic device 101 may store an edited preview video reflecting play speeds adjusted using the individual speed adjustment objects 441 and 443 on the fourth screen 440.

According to an embodiment, the electronic device 101 may identify that there are image frames 461 corresponding to a different third element (e.g., hand shaking of the gesture) in the second main part 221b. The electronic device 101 may display, on the fourth screen 440, an expanding object 445 for screen expanding, displayed in an area adjacent to the individual speed adjustment object 443. When the expanding object 445 is selected, the electronic device 101 may, as illustrated in FIG. 12, display a screen (e.g., fifth screen 450) obtained by expanding a partial area (e.g., an area in which the individual speed adjustment object 443 is displayed) of the fourth screen 440. The electronic device 101 may further display an individual speed adjustment object 451 for adjusting the play speed of the first sub main part 1111 corresponding to the different third element (e.g., hand shaking of the gesture) on the fifth screen 450. According to an embodiment, the electronic device 101 may display, on the fifth screen 450, a storage object 457 for storing the edited preview video. When the storage object 457 is selected, the electronic device 101 may store an edited preview video reflecting play speeds adjusted using the individual speed adjustment objects 441, 443, 451, and 433 on the fifth screen 450. When the expanding object 445 is selected again, the electronic device 101 may return to the fourth screen 440 again. For example, the electronic device 101 may adjust the play speed (e.g., 3×) of the first sub main part 1111 included in the second main part 221b by using the individual speed adjustment object 451. The play speed of a second sub main part 1113 may be maintained to the play speed set for the second main part 221b.

The speed adjustment objects 431 and 433 and the individual speed adjustment objects 441, 443, and 451 are illustrated in a bar type in FIGS. 4 and 11 described above, and may be illustrated as a user interface adjusted by a user's input, or result information automatically adjusted in the electronic device 101. The speed adjustment objects 431 and 433 and the individual speed adjustment objects 441, 443, and 451 may be replaced to be in a graph type as illustrated in FIG. 12, but are not limited thereto and may be illustrated by various types of graphic elements.

According to an embodiment, an operation method of an electronic device (e.g., the electronic device 101 in FIGS. 1 and 2) may include: obtaining a video, classifying, based on a designated condition, image frames included in the video into at least one first type interval and at least one second type interval, distinguishing at least one main part, based on image frames corresponding to at least one element included in the designated condition in the at least one first type interval, setting a play speed of the at least one main part to be different from a play speed of at least one different part, displaying an edited preview video including the at least one main part reflecting the set play speed on a display module (e.g., the display module 160 in FIG. 1) of the electronic device, and storing the edited preview video in a memory (e.g., the memory 130 in FIG. 1) of the electronic device.

According to an embodiment, the method may further include displaying the video on a first screen, displaying at least one preview video according to at least one editing scheme for video editing in an area adjacent to the first screen on which the video is displayed, in response to the at least one preview video being selected, displaying a second screen for editing the selected preview video, displaying, in response to a speed editing request, a third screen for editing a play speed of the video, and displaying, on the third screen, a first speed adjustment object for editing the play speed of the at least one main part.

According to an embodiment, the method may further include displaying a second speed adjustment object for editing the play speed of the different part on the third screen, and displaying, on an expansion area of the speed editing screen, individual speed adjustment objects for adjusting play speeds of a plurality of main parts. The different part may be a non-main part included in the second type interval.

According to an embodiment, the method may further include, when there are a plurality of first type intervals, collecting the plurality of first type intervals except the second type interval to generate the edited preview video.

According to an embodiment, the configuring of the play speed of the at least one main part to be different from the play speed of the at least one different part may include, in response to there being a plurality of main parts, setting different play speeds for the plurality of main parts, respectively.

According to an embodiment, in the method, the edited preview video including the at least one main part reflecting the set play speed and the different part included in the second type interval may be generated.

According to an embodiment, the setting of the play speed of the at least one main part to be different from the play speed of the at least one different part may include, in response to there being a plurality of main parts, setting a first play speed for main parts corresponding to a first element included in the designated condition among the plurality of main parts, setting a second play speed for at least one different main part corresponding to a second element included in the designated condition, and setting a third play speed for the different part included in the second type interval.

According to an embodiment, the setting of the play speed of the at least one main part to be different from the play speed of the at least one different part may include, in response to there being a plurality of main parts, adjusting a play speed of one of the plurality of main parts.

According to an embodiment, the setting of the play speed of the at least one main part to be different from the play speed of the at least one different part may include, in response to image frames corresponding to two or more elements included in the designated condition being identified in the at least one main part, dividing the at least one main part into sub main parts corresponding to the two or more elements, respectively and setting different play speeds for the sub main parts.

According to an embodiment, in a non-transitory storage medium storing a program, the program comprising executable instructions which, when executed by a processor of an electronic device, cause the processor to execute the operations of obtaining a video, classifying, based on a designated condition, image frames included in the video into at least one first type interval and at least one second type interval, distinguishing at least one main part, based on image frames corresponding to at least one element included in the designated condition in the at least one first type interval, setting a play speed of the at least one main part to be different from a play speed of at least one different part, displaying an edited preview video including the at least one main part reflecting the set play speed on a display module of an electronic device, and storing the edited preview video in a memory of the electronic device.

The embodiments disclosed herein are proposed for explanation and understanding of the disclosed technical content, and are not intended to limit the scope of the technology disclosed herein. Therefore, the scope of this document should be interpreted as including all variations or various other embodiments based on the technical concept of this document.

An electronic device according to various embodiments disclosed herein may be various types of devices. The electronic device may include, for example, a portable communication device (e.g., a smartphone), a computer device, a portable multimedia device, a portable medical device, a camera, a wearable device, or a home appliance. An electronic device according to an embodiment disclosed herein is not limited to the above devices.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:
1. An electronic device comprising:
   a display circuit;
   a memory; and
   at least one processor electrically connected to the display circuit and the memory,
   wherein the at least one processor is configured to:
     obtain a video,
     classify, based on a designated condition, image frames included in the video into at least one first type interval and at least one second type interval,
     distinguish at least one main part, based on image frames corresponding to at least one element included in the designated condition in the at least one first type interval,
     control, in response to a speed editing request, the display circuit to display a speed editing screen for editing a play speed of the video, wherein the speed editing screen includes a first speed adjustment object for editing a play speed of the at least one main part and a second speed adjustment object for editing a play speed of a non-main part of the at least one second type interval,
     set the play speed of the at least one main part to be different from the play speed of the non-main part, control the display circuit to display an edited preview video including the at least one main part reflecting the set play speed and the non-main part reflecting the set play speed, and store the edited preview video in the memory.

2. The electronic device of claim 1, wherein the at least one processor is further configured to:

display the video on a first screen;

control the display circuit to display at least one preview video according to at least one editing scheme for video editing in an area adjacent to the first screen on which the video is displayed; and in response to the at least one preview video being selected, control the display circuit to display a second screen for editing the selected preview video.

3. The electronic device of claim 2, wherein the at least one processor is further configured to:

display a second speed adjustment object for editing the play speed of the non-main part on a third screen, the non-main part being included in the second type interval; and control the display circuit to display, on an expansion area of the speed editing screen, individual speed adjustment objects for adjusting play speeds of a plurality of main parts.

4. The electronic device of claim 1, wherein the at least one processor is further configured to, in response to there being a plurality of first type intervals, collect the plurality of first type intervals except the second type interval to generate the edited preview video.

5. The electronic device of claim 1, wherein the at least one processor is further configured to:

in response to there being a plurality of main parts, set different play speeds for the plurality of main parts, respectively; and generate the edited preview video including the plurality of main parts reflecting the set different play speeds.

6. The electronic device of claim 1, wherein the at least one processor is further configured to generate the edited preview video including the at least one main part reflecting the set play speed and the non-main part included in the second type interval.

7. The electronic device of claim 6, wherein the at least one processor is further configured to:

in response to there being a plurality of main parts, set a first play speed for main parts corresponding to a first element included in the designated condition among the plurality of main parts;

set a second play speed for at least one different main part corresponding to a second element included in the designated condition; and set a third play speed for the non-main part included in the second type interval.

8. The electronic device of claim 6, wherein the at least one processor is further configured to, in response to there being a plurality of main parts, adjust a play speed of one of the plurality of main parts.

9. The electronic device of claim 1, wherein the at least one processor is further configured to:

in response to image frames corresponding to two or more elements included in the designated condition being identified in the at least one main part, divide the at least one main part into sub main parts corresponding to the two or more elements, respectively;

set different play speeds for the sub main parts; and generate the edited preview video including the sub main parts reflecting the set different play speeds.

10. The electronic device of claim 1, wherein the designated condition comprises information on at least one among an action, a gesture, or an emotion for distinguishing the first type interval, and wherein the first type interval comprises at least one image frame corresponding to the designated condition.

11. An operation method of an electronic device, the method comprising:

obtaining a video;

classifying, based on a designated condition, image frames included in the video into at least one first type interval and at least one second type interval;

distinguishing at least one main part, based on image frames corresponding to at least one element included in the designated condition in the at least one first type interval;

in response to a speed editing request, displaying a speed editing screen for editing a play speed of the video on a display circuit of the electronic device, wherein the speed editing screen includes a first speed adjustment object for editing a play speed of the at least one main part and a second speed adjustment object for editing a play speed of a non-main part of the at least one second type interval;

setting the play speed of the at least one main part to be different from the play speed of the non-main part;

displaying an edited preview video including the at least one main part reflecting the set play speed and the non-main part reflecting the set play speed; and storing the edited preview video in a memory of the electronic device.

12. The method of claim 11, further comprising:

displaying the video on a first screen;

displaying at least one preview video according to at least one editing scheme for video editing in an area adjacent to the first screen on which the video is displayed; and in response to the at least one preview video being selected, displaying a second screen for editing the selected preview video.

13. The method of claim 12, further comprising:

displaying a second speed adjustment object for editing the play speed of the non-main part on a third screen, the non-main part being included in the second type interval; and displaying, on an expansion area of the speed editing screen, individual speed adjustment objects for adjusting play speeds of a plurality of main parts, wherein the non-main part is included in the second type interval.

14. The method of claim 11, further comprising, in response to there being a plurality of first type intervals, collecting the plurality of first type intervals except the second type interval to generate the edited preview video.

15. The method of claim 11, wherein the setting of the play speed of the at least one main part to be different from the play speed of the non-main part comprises, in response to there being a plurality of main parts, setting different play speeds for the plurality of main parts, respectively.

16. The method of claim 11, wherein the edited preview video including the at least one main part reflecting the set play speed and the non-main part included in the second type interval is generated.

17. The method of claim 16, wherein the setting of the play speed of the at least one main part to be different from the play speed of the non-main part comprises:

in response to there being a plurality of main parts, setting a first play speed for main parts corresponding to a first element included in the designated condition among the plurality of main parts;

setting a second play speed for at least one different main part corresponding to a second element included in the designated condition; and setting a third play speed for the non-main part included in the second type interval.

18. The method of claim 16, wherein the setting of the play speed of the at least one main part to be different from the play speed of the non-main part comprises, in response to there being a plurality of main parts, adjusting a play speed of one of the plurality of main parts.

19. The method of claim 16, wherein the setting of the play speed of the at least one main part to be different from the play speed of the non-main part comprises:

in response to image frames corresponding to two or more elements included in the designated condition being identified in the at least one main part, dividing the at least one main part into sub main parts corresponding to the two or more elements, respectively; and setting different play speeds for the sub main parts.

20. A non-transitory storage medium storing a program, the program comprising executable instructions which, when executed by a processor of an electronic device, cause the processor to execute operations of:

obtaining a video;

classifying, based on a designated condition, image frames included in the video into at least one first type interval and at least one second type interval;

distinguishing at least one main part, based on image frames corresponding to at least one element included in the designated condition in the at least one first type interval;

in response to a speed editing request, displaying a speed editing screen for editing a play speed of the video on a display circuit of the electronic device, wherein the speed editing screen includes a first speed adjustment object for editing a play speed of the at least one main part and a second speed adjustment object for editing a play speed of a non-main part of the at least one second type interval;

setting the play speed of the at least one main part to be different from the play speed of the non-main part;

displaying an edited preview video including the at least one main part reflecting the set play speed and the non-main part reflecting the set play speed; and storing the edited preview video in a memory of the electronic device.

21. The non-transitory storage medium of claim 20, wherein the designated condition comprises information on at least one of an action, a gesture, or an emotion for distinguishing the first type interval.

22. The non-transitory storage medium of claim 20, wherein the first type interval comprises at least one image frame corresponding to the designated condition.

23. The non-transitory storage medium of claim 20, wherein the edited preview video is displayed according to at least one editing scheme, the at least one editing scheme comprising one of dynamic speed, highlights, speed ramping, quick summary, or short clip.

* * * * *